I # United States Patent
Gad et al.

(10) Patent No.: US 12,506,557 B2
(45) Date of Patent: Dec. 23, 2025

(54) SPECTRAL EFFICIENCY AWARE PREDICTIVE MODULATION AND CODING SCHEME TABLE SELECTION

(71) Applicant: Dell Products L.P., Round Rock, TX (US)

(72) Inventors: Omar Gad, London (GB); Marwan Mansour, Alexandria (EG); Medhat Mohamed Khalifa, Giza (EG); Mohamed Abouzeid, Sheikh Zayed (EG)

(73) Assignee: DELL PRODUCTS L.P., Round Rock, TX (US)

( * ) Notice: Subject to any disclaimer, the term of this patent is extended or adjusted under 35 U.S.C. 154(b) by 317 days.

(21) Appl. No.: 18/362,012

(22) Filed: Jul. 31, 2023

(65) Prior Publication Data

US 2025/0047407 A1  Feb. 6, 2025

(51) Int. Cl.
H04W 4/00 (2018.01)
H04L 1/00 (2006.01)

(52) U.S. Cl.
CPC .......... H04L 1/0003 (2013.01); H04L 1/0009 (2013.01)

(58) Field of Classification Search
CPC ........................... H04L 1/0003; H04L 1/0009
USPC .......................................................... 370/329
See application file for complete search history.

(56) References Cited

U.S. PATENT DOCUMENTS

2007/0259671 A1  11/2007  Cheng et al.
2009/0141648 A1  6/2009  Imamura et al.
2013/0028530 A1 *  1/2013  Drugeon ............. H04N 19/593
                                                                                    382/233
2020/0267042 A1  8/2020  Einhaus et al.
2022/0094403 A1 *  3/2022  Forenza ............... H04B 7/0456

OTHER PUBLICATIONS

International Search Report and Written Opinion received for PCT Application Serial No. PCT/US2023/036307 dated May 3, 2024, 18 pages.
Li et al., "Extendable CQI Table Design For Higher Order Modulation in LTE Downlink Transmission", IEEE/CIC ICCC Symposium on Communication and Control Theory, 2015, 5 pages.

* cited by examiner

*Primary Examiner* — Temica M Beamer
(74) *Attorney, Agent, or Firm* — Amin, Turocy & Watson, LLP

(57) ABSTRACT

Spectral efficiency aware predictive modulation and coding scheme table selection (e.g., using a computerized tool), is enabled. For example, a method can comprise, based on spectral efficiency key performance indicator data, determining, by network equipment comprising a processor, a predicted spectral efficiency applicable to a user equipment, based on fluctuation key performance indicator data, determining, by the network equipment, predicted spectral efficiency fluctuation applicable to the user equipment, based on the predicted spectral efficiency and the predicted spectral efficiency fluctuation, determining, by the network equipment, a predicted spectral efficiency range, and based on the predicted spectral efficiency range, selecting, by the network equipment, a modulation and coding scheme table, for the user equipment, determined to modify a spectral granularity within the predicted spectral efficiency range to satisfy a spectral granularity criterion within the predicted spectral efficiency range.

20 Claims, 13 Drawing Sheets

FIG. 7

1002 — BASED ON SPECTRAL EFFICIENCY KEY PERFORMANCE INDICATOR DATA, DETERMINING A PREDICTED SPECTRAL EFFICIENCY APPLICABLE TO A USER EQUIPMENT

1004 — BASED ON FLUCTUATION KEY PERFORMANCE INDICATOR DATA, DETERMINING PREDICTED SPECTRAL EFFICIENCY FLUCTUATION APPLICABLE TO THE USER EQUIPMENT

1006 — BASED ON THE PREDICTED SPECTRAL EFFICIENCY AND THE PREDICTED SPECTRAL EFFICIENCY FLUCTUATION, DETERMINING A PREDICTED SPECTRAL EFFICIENCY RANGE

1008 — BASED ON THE PREDICTED SPECTRAL EFFICIENCY RANGE, SELECTING A MODULATION AND CODING SCHEME TABLE, FOR THE USER EQUIPMENT, DETERMINED TO MAXIMIZE SPECTRAL GRANULARITY WITHIN THE PREDICTED SPECTRAL EFFICIENCY RANGE

FIG. 10

1102 — BASED ON SPECTRAL EFFICIENCY KEY PERFORMANCE INDICATOR DATA, DETERMINING, BY NETWORK EQUIPMENT COMPRISING A PROCESSOR, A PREDICTED SPECTRAL EFFICIENCY APPLICABLE TO A USER EQUIPMENT

1104 — BASED ON FLUCTUATION KEY PERFORMANCE INDICATOR DATA, DETERMINING, BY THE NETWORK EQUIPMENT, PREDICTED SPECTRAL EFFICIENCY FLUCTUATION APPLICABLE TO THE USER EQUIPMENT

1106 — BASED ON THE PREDICTED SPECTRAL EFFICIENCY AND THE PREDICTED SPECTRAL EFFICIENCY FLUCTUATION, DETERMINING, BY THE NETWORK EQUIPMENT, A PREDICTED SPECTRAL EFFICIENCY RANGE

1108 — BASED ON THE PREDICTED SPECTRAL EFFICIENCY RANGE, SELECTING, BY THE NETWORK EQUIPMENT, A MODULATION AND CODING SCHEME TABLE, FOR THE USER EQUIPMENT, DETERMINED TO MODIFY A SPECTRAL GRANULARITY WITHIN THE PREDICTED SPECTRAL EFFICIENCY RANGE TO SATISFY A SPECTRAL GRANULARITY CRITERION WITHIN THE PREDICTED SPECTRAL EFFICIENCY RANGE

FIG. 11

SPECTRAL EFFICIENCY AWARE PREDICTIVE MODULATION AND CODING SCHEME TABLE SELECTION

BACKGROUND

The third generation partnership project (3GPP) defines different modulation and coding scheme (MCS) tables that are configured to a user equipment (UE) via radio resource control (RRC) messages based on channel conditions. Each table has a trade-off between spectral efficiency and reliability for a given UE. For example, a 256 QAM table can be selected if the UE is experiencing good channel conditions and tolerate a 10% block error rate (BLER), while a much lower-order MCS table can be selected for ultra-reliable low latency communications (URLLC) traffic that require less than 0.01% BLER in all channel conditions.

The wrong/suboptimal assignment of MCS table can impact system performance and capacity. If a gNB or system assigns the wrong MCS table to a UE, suboptimal data throughput can result, which can impact an overall system. If the assigned MCS table is too low for current radio conditions, the UE may not be able to achieve its maximum data rate potential. If the assigned MCS table is too high, the UE may experience high error rates, and may not be able to maintain a stable connection. In addition, switching between MCS tables can cause a temporary degradation in spectral efficiency due to the use of robust MCS values during the switching period. In case of a gNB or system assigning the wrong MCS table to multiple UEs, congestion and a decrease in overall system capacity can occur due to suboptimal resource utilization.

The above-described background relating to telecommunications systems is merely intended to provide a contextual overview of some current issues and is not intended to be exhaustive. Other contextual information may become further apparent upon review of the following detailed description.

BRIEF DESCRIPTION OF DRAWINGS

FIG. 7 is a diagram of an example scenario in accordance with one or more embodiments described herein.

FIG. 10 is a block flow diagram for a process associated with spectral efficiency aware predictive modulation and coding scheme table selection in accordance with one or more embodiments described herein.

FIG. 11 is a block flow diagram for a process associated with spectral efficiency aware predictive modulation and coding scheme table selection in accordance with one or more embodiments described herein.

DETAILED DESCRIPTION

Figure 1:
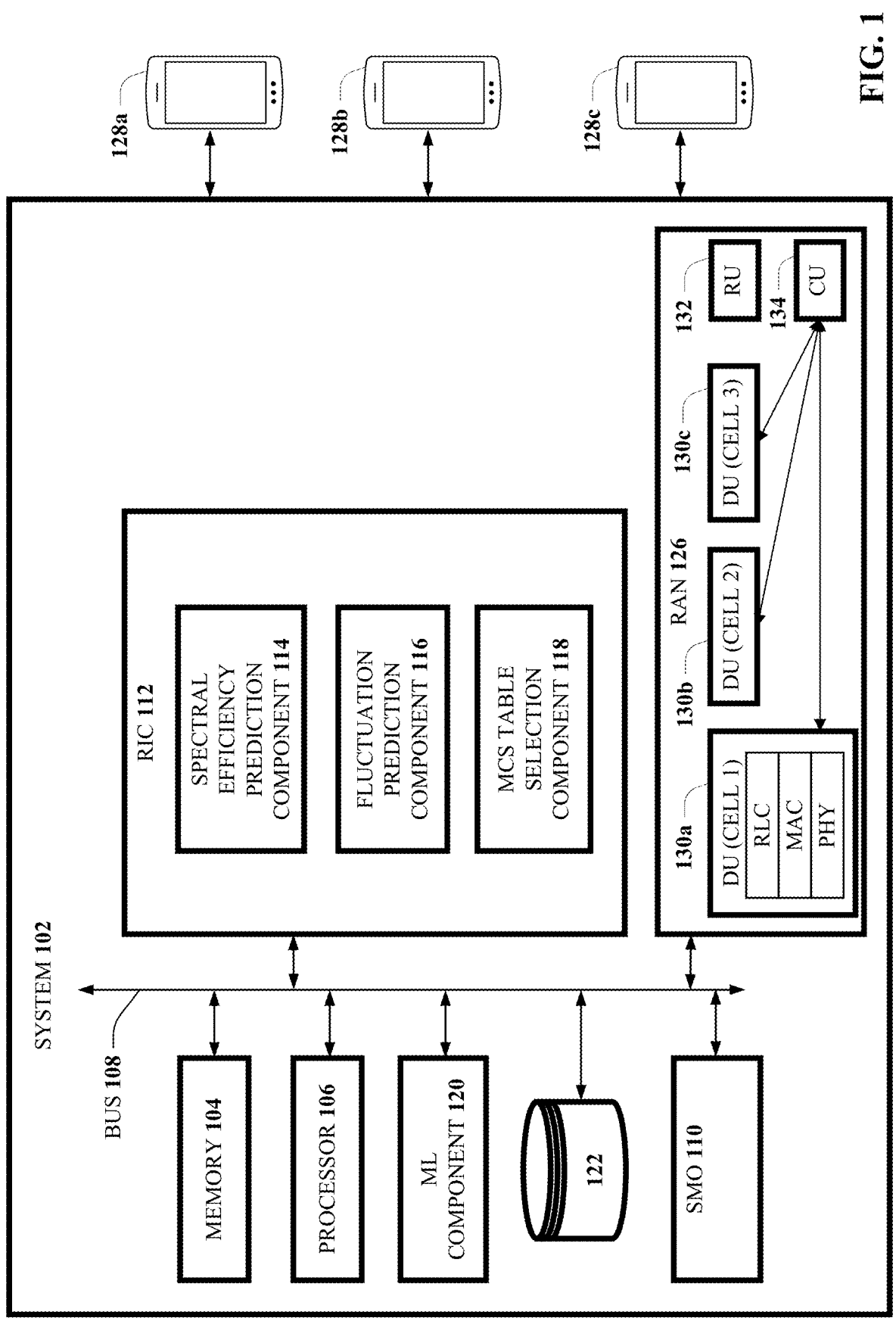
FIG. 1 is a block diagram of an exemplary system in accordance with one or more embodiments described herein.

The subject disclosure is now described with reference to the drawings, wherein like reference numerals are used to refer to like elements throughout. In the following description, for purposes of explanation, numerous specific details are set forth in order to provide a thorough understanding of the subject disclosure. It may be evident, however, that the subject disclosure may be practiced without these specific details. In other instances, well-known structures and devices are shown in block diagram form in order to facilitate describing the subject disclosure.

As alluded to above, MCS table selection can be improved in various ways, and various embodiments are described herein to this end and/or other ends. The disclosed subject matter relates to telecommunications systems and, more particularly, to spectral efficiency aware predictive modulation and coding scheme table selection.

According to an embodiment, a system can comprise a processor, and a memory that stores executable instructions that, when executed by the processor, facilitate performance of operations, comprising, based on spectral efficiency key performance indicator data representative of performance of spectral efficiency applicable to a user equipment, determining predicted spectral efficiency data representative of a predicted spectral efficiency applicable to the user equipment, based on fluctuation key performance indicator data representative of fluctuation of spectral efficiency applicable to the user equipment, determining predicted spectral efficiency fluctuation data representative of a predicted spectral efficiency fluctuation applicable to the user equipment, based on the predicted spectral efficiency data and the predicted spectral efficiency fluctuation data, determining predicted range data representative of a predicted spectral efficiency range, and based on the predicted range data, selecting a modulation and coding scheme table, for use by the user equipment, determined to achieve at least a threshold spectral granularity within the predicted spectral efficiency range.

In one or more embodiments, the determining of the predicted spectral efficiency data can comprise, using a spectral efficiency prediction model generated using machine learning based on past spectral efficiency key performance indicator data, other than the spectral efficiency key performance indicator data.

In one or more embodiments, the predicted spectral efficiency data can comprise average predicted spectral efficiency data representative of an average predicted spectral efficiency.

In one or more embodiments, the determining of the predicted spectral efficiency fluctuation data can comprise using a spectral efficiency fluctuation prediction model generated using machine learning based on past fluctuation key performance indicator data, other than the fluctuation key performance indicator data.

In one or more embodiments, the spectral efficiency key performance indicator data can comprise at least one of channel quality indicator data representative of channel qualities applicable to the user equipment, time advance data representative of time advances applicable to the user equipment, quality of service flow data representative of quality of service flows applicable to the user equipment, signal to interference plus noise ratio data representative of signal to interference plus noise ratios applicable to the user equipment, buffer status report data representative of buffer status reports applicable to the user equipment, block error rate data representative of block error rates applicable to the user equipment, rank indicator data representative of rank indicators applicable to the user equipment, or precoding matrix indication data representative of precoding matrix indications applicable to the user equipment.

In one or more embodiments, the fluctuation key performance indicator data can comprise at least one of time advance data representative of time advances applicable to the user equipment, block error rate data representative of block error rates applicable to the user equipment, automatic neighbor relations data representative of automatic neighbor relations applicable to the user equipment, beam identifier data representative of beam identifiers associated with the user equipment, or power headroom data applicable to the user equipment.

In one or more embodiments, the selecting can comprise selecting the modulation and coding scheme table determined to maximize the spectral granularity within the predicted spectral efficiency range, and wherein the modulation and coding scheme table comprises a largest quantity of modulation and coding scheme indexes from among a group of modulation and coding scheme tables applicable to the user equipment.

In one or more embodiments, the determining of the predicted spectral efficiency data can comprise determining the predicted spectral efficiency data based on at least one of traffic type, interference data representative of interference associated with the user equipment, user equipment location representative of a location of the user equipment, or an expected quality applicable to the user equipment.

In one or more embodiments, the predicted spectral efficiency fluctuation can be further determined based on at least one of a mobility pattern associated with the user equipment, interference data representative of interference associated with the user equipment, or channel conditions applicable to the user equipment.

In another embodiment, a non-transitory machine-readable medium can comprise executable instructions that, when executed by a processor, facilitate performance of operations, comprising, based on spectral efficiency key performance indicator data, determining a predicted spectral efficiency applicable to a user equipment, based on fluctuation key performance indicator data, determining predicted spectral efficiency fluctuation applicable to the user equipment, based on the predicted spectral efficiency and the predicted spectral efficiency fluctuation, determining a predicted spectral efficiency range, and based on the predicted spectral efficiency range, selecting a modulation and coding scheme table, for the user equipment, determined to maximize spectral granularity within the predicted spectral efficiency range.

In one or more embodiments, the predicted spectral efficiency can be further determined using a spectral efficiency prediction model generated using machine learning based on past spectral efficiency key performance indicator data, other than the spectral efficiency key performance indicator data.

In one or more embodiments, the predicted spectral efficiency can comprise an average predicted spectral efficiency.

In one or more embodiments, the predicted spectral efficiency fluctuation can be further determined using a spectral efficiency fluctuation prediction model generated using machine learning based on past fluctuation key performance indicator data, other than the fluctuation key performance indicator data.

In one or more embodiments, the spectral efficiency key performance indicator data can comprise at least one of channel quality indicator data, time advance data, quality of service flow data, signal to interference plus noise ratio data, buffer status report data, block error rate data, rank indicator data, or precoding matrix indication data applicable to the user equipment.

In one or more embodiments, the fluctuation key performance indicator data can comprise at least one of time advance data, block error rate data, automatic neighbor relations data, beam identifier data, or power headroom data applicable to the user equipment.

According to yet another embodiment, a method can comprise, based on spectral efficiency key performance indicator data, determining, by network equipment comprising a processor, a predicted spectral efficiency applicable to a user equipment, based on fluctuation key performance indicator data, determining, by the network equipment, predicted spectral efficiency fluctuation applicable to the user equipment, based on the predicted spectral efficiency and the predicted spectral efficiency fluctuation, determining, by the network equipment, a predicted spectral efficiency range, and based on the predicted spectral efficiency range, selecting, by the network equipment, a modulation and coding scheme table, for the user equipment, determined to modify a spectral granularity within the predicted spectral efficiency range to satisfy a spectral granularity criterion within the predicted spectral efficiency range.

In one or more embodiments, the selecting to satisfy the spectral granularity criterion can comprise selecting the modulation and coding scheme table determined to maximize the spectral granularity within the predicted spectral efficiency range, and wherein the modulation and coding scheme table comprises a largest quantity of modulation and coding scheme indexes from among a group of modulation and coding scheme tables applicable to the user equipment.

In one or more embodiments, the determining of the predicted spectral efficiency can comprise determining the predicted spectral efficiency based on at least one of traffic type, interference data, user equipment location, or expected quality applicable to the user equipment.

In one or more embodiments, the determining of the predicted spectral efficiency fluctuation can comprise determining the predicted spectral efficiency fluctuation based on at least one of mobility pattern, interference data, or channel conditions applicable to the user equipment.

In one or more embodiments, the determining of the predicted spectral efficiency can comprise determining an average predicted spectral efficiency.

It should be appreciated that additional manifestations, configurations, implementations, protocols, etc. can be utilized in connection with the following components described herein or different/additional components as would be appreciated by one skilled in the art.

Embodiments herein can dynamically change an MCS table in accordance with corresponding UE behavioral changes. This can ensure that the UE is using the MCS table with the highest granularity, for instance, to enable dynamic changing of the MCS according to the UE's needs. After localizing the range that the UE can function in, embodiments herein can be configured to identify the MCS table that has the highest granularity fitting this range. Semi-persistent scheduling (SPS) can be configured to utilize a set of MCS tables instead of a single MCS table. Embodiments herein can thus be configured to select the most appropriate MCS table.

Embodiments herein can increase granularity in possible MCS indexes, thus leading to more robust communication and increased UE performance. Embodiments herein can balance between allowing UEs to receive data in fewer slots and allowing for fewer transmissions, per UE, all while increasing the reliability of the transmissions. Embodiments herein can thus reduce risk of assigning suboptimal MCS tables based on static conditions, for instance, by better identifying and forecasting UE requirements and channel conditions to assign MCS tables herein, thereby maximizing spectral efficiency of cell resources, as well as power efficiency, for instance, by reducing the number of retransmissions and unnecessary transmissions.

Turning now to FIG. 1, there is illustrated an example, non-limiting system 102 in accordance with one or more embodiments herein. System 102 can comprise a computerized tool, which can be configured to perform various operations relating to spectral efficiency aware predictive modulation and coding scheme table selection. The system 102 can comprise one or more of a variety of components, such as memory 104, processor 106, bus 108, SMO 110, radio intelligent controller (RIC) 112, spectral efficiency prediction component 114, fluctuation prediction component 116, MCS table selection component 118, ML component 120, model(s) 122, radio access network (RAN) 126 (e.g., an E2 node), distributed units (DUs) 130, radio unit (RU) 132, and central unit (CU) 134. In various embodiments, the system 102 can be communicatively coupled to, or can further comprise, one or more user equipment (UE) 128. In various embodiments, one or more of the memory 104, processor 106, bus 108, SMO 110, RIC 112, spectral efficiency prediction component 114, fluctuation prediction component 116, MCS table selection component 118, ML component 120, model(s) 122, RAN 126 (e.g., an E2 node), one or more of UE 128, one or more of DU 130, RU 132, and/or CU 134 can be communicatively or operably coupled (e.g., over a bus or wireless network) to one another to perform one or more functions of the system 102.

In various embodiments, the spectral efficiency prediction component 114 can, based on spectral efficiency key performance indicator data representative of performance of spectral efficiency applicable to a UE 128, determine predicted spectral efficiency data representative of a predicted spectral efficiency applicable to the UE 128. In various embodiments, the spectral efficiency key performance indicator data can comprise at least one of channel quality indicator data representative of channel qualities applicable to the UE 128, time advance data representative of time advances applicable to the UE 128, quality of service (QOS) flow data representative of QoS flows applicable to the UE 128, signal to interference plus noise ratio (SINR) data representative of SINRs applicable to the UE 128, buffer status report data representative of buffer status reports applicable to the UE 128, block error rate (BER) data representative of BERs applicable to the UE 128, rank indicator data representative of rank indicators applicable to the UE 128, and/or precoding matrix indication data representative of precoding matrix indications applicable to the UE 128. In one or more embodiments, the determining of the predicted spectral efficiency data can comprise determining the predicted spectral efficiency data based on at least one of traffic type, interference data representative of interference associated with the UE 128, UE 128 location representative of a location of the UE 128, and/or an expected quality applicable to the UE 128. In various embodiments, the predicted spectral efficiency data comprises average predicted spectral efficiency data representative of an average predicted spectral efficiency.

In one or more embodiments, the determining (e.g., via the spectral efficiency prediction component 114) of the predicted spectral efficiency data can comprise using a spectral efficiency prediction model (e.g., of the model(s) 122) generated using machine learning (e.g., via the ML component 120) based on past spectral efficiency key performance indicator data, other than the spectral efficiency key performance indicator data.

In various embodiments, the fluctuation prediction component 116 can, based on fluctuation key performance indicator data representative of fluctuation of spectral efficiency applicable to the UE 128, determine predicted spectral efficiency fluctuation data representative of a predicted spectral efficiency fluctuation applicable to the UE 128. In various embodiments, the fluctuation key performance indicator data can comprise at least one of time advance data representative of time advances applicable to the UE 128, BLER data representative of BLERs applicable to the UE 128, automatic neighbor relations (AMR) data representative of AMRs applicable to the UE 128, beam identifier data representative of beam identifiers associated with the UE 128, and/or power headroom data applicable to the UE 128. In one or more embodiments, the predicted spectral efficiency fluctuation can be further determined (e.g., via the fluctuation prediction component 116) based on at least one of a mobility pattern associated with the UE 128, interference data representative of interference associated with the UE 128, and/or channel conditions applicable to the UE 128.

In one or more embodiments, the determining (e.g., via the fluctuation prediction component 116) of the predicted spectral efficiency fluctuation data can comprise using a spectral efficiency fluctuation prediction model generated using machine learning (e.g., via the ML component 120) based on past fluctuation key performance indicator data, other than the fluctuation key performance indicator data.

In various embodiments, the MCS table selection component 118 can, based on the predicted spectral efficiency data (e.g., via the spectral efficiency prediction component 114) and the predicted spectral efficiency fluctuation data (e.g., via the fluctuation prediction component 116), determine predicted range data representative of a predicted spectral efficiency range. In various embodiments, the MCS table selection component 118 can further, based on the predicted range data, select an MCS table, for use by the UE 128, determined (e.g., via the MCS table selection component 118) to achieve at least a threshold spectral granularity within the predicted spectral efficiency range. In one or more embodiments, the selecting can comprise selecting (e.g., via the MCS table selection component 118) the MCS table determined to maximize the spectral granularity within the predicted spectral efficiency range. In this regard, the MSC table can comprise a largest quantity of MCS indexes from among a group of MCS tables applicable to the UE 128.

In various embodiments, the MCS table selection component 118 can, given the expected spectral efficiency and fluctuation, select the MCS table with the widest selection of MCS configurations for the spectral efficiency range. Depending on the predicted spectral efficiency and its fluctuation, the UE 128 can be configured a higher MCS table if the deviation is low or the predicted spectral efficiency is high. In various embodiments, the MCS table selection component 118 can configure a gNB or system herein to support communication with the UE 128 using multiple MCS tables. The gNB or system 102 herein can select the best available MCS table on a MAC layer (e.g., determined to maximize granularity) without triggering RRC signaling with the UE. In various embodiments, the foregoing can be achieved through semi-persistent scheduling.

Various embodiments herein can employ artificial-intelligence or machine learning systems and techniques to facilitate learning user behavior, context-based scenarios, preferences, etc. in order to facilitate taking automated action with high degrees of confidence. Utility-based analysis can be utilized to factor benefit of taking an action against cost of taking an incorrect action. Probabilistic or statistical-based analyses can be employed in connection with the foregoing and/or the following.

It is noted that systems and/or associated controllers, servers, or machine learning components herein can comprise artificial intelligence component(s) which can employ an artificial intelligence (A.I.) model and/or M.L. or an M.L. model that can learn to perform the above or below described functions (e.g., via training using historical training data and/or feedback data).

In some embodiments, ML component 120 can comprise an A.I. and/or M.L. model that can be trained (e.g., via supervised and/or unsupervised techniques) to perform the above or below-described functions using historical training data comprising various context conditions that correspond to various augmented network optimization operations. In this example, such an A.I. and/or M.L. model can further learn (e.g., via supervised and/or unsupervised techniques) to perform the above or below-described functions using training data comprising feedback data, where such feedback data can be collected and/or stored (e.g., in memory) by the ML component 120. In this example, such feedback data can comprise the various instructions described above/below that can be input, for instance, to a system herein, over time in response to observed/stored context-based information.

A.I./M.L. components herein can initiate an operation(s) associated with a based on a defined level of confidence determined using information (e.g., feedback data). For example, based on learning to perform such functions described above using feedback data, performance information, and/or past performance information herein, a ML component 120 herein can initiate an operation associated with determining various thresholds herein (e.g., a motion pattern thresholds, input pattern thresholds, similarity thresholds, authentication signal thresholds, audio frequency thresholds, or other suitable thresholds).

In an embodiment, the ML component 120 can perform a utility-based analysis that factors cost of initiating the above-described operations versus benefit. In this embodiment, the ML component 120 can use one or more additional context conditions to determine various thresholds herein.

To facilitate the above-described functions, a ML component 120 herein can perform classifications, correlations, inferences, and/or expressions associated with principles of artificial intelligence. For instance, the ML component 120 can employ an automatic classification system and/or an automatic classification. In one example, the ML component 120 can employ a probabilistic and/or statistical-based analysis (e.g., factoring into the analysis utilities and costs) to learn and/or generate inferences. The ML component 120 can employ any suitable machine-learning based techniques, statistical-based techniques and/or probabilistic-based techniques. For example, the ML component 120 can employ expert systems, fuzzy logic, support vector machines (SVMs), Hidden Markov Models (HMMs), greedy search algorithms, rule-based systems, Bayesian models (e.g., Bayesian networks), neural networks, other non-linear training techniques, data fusion, utility-based analytical systems, systems employing Bayesian models, and/or the like. In another example, the ML component 120 can perform a set of machine-learning computations. For instance, the ML component 120 can perform a set of clustering machine learning computations, a set of logistic regression machine learning computations, a set of decision tree machine learning computations, a set of random forest machine learning computations, a set of regression tree machine learning computations, a set of least square machine learning computations, a set of instance-based machine learning computations, a set of regression machine learning computations, a set of support vector regression machine learning computations, a set of k-means machine learning computations, a set of spectral clustering machine learning computations, a set of rule learning machine learning computations, a set of Bayesian machine learning computations, a set of deep Boltzmann machine computations, a set of deep belief network computations, and/or a set of different machine learning computations.

Figure 2:
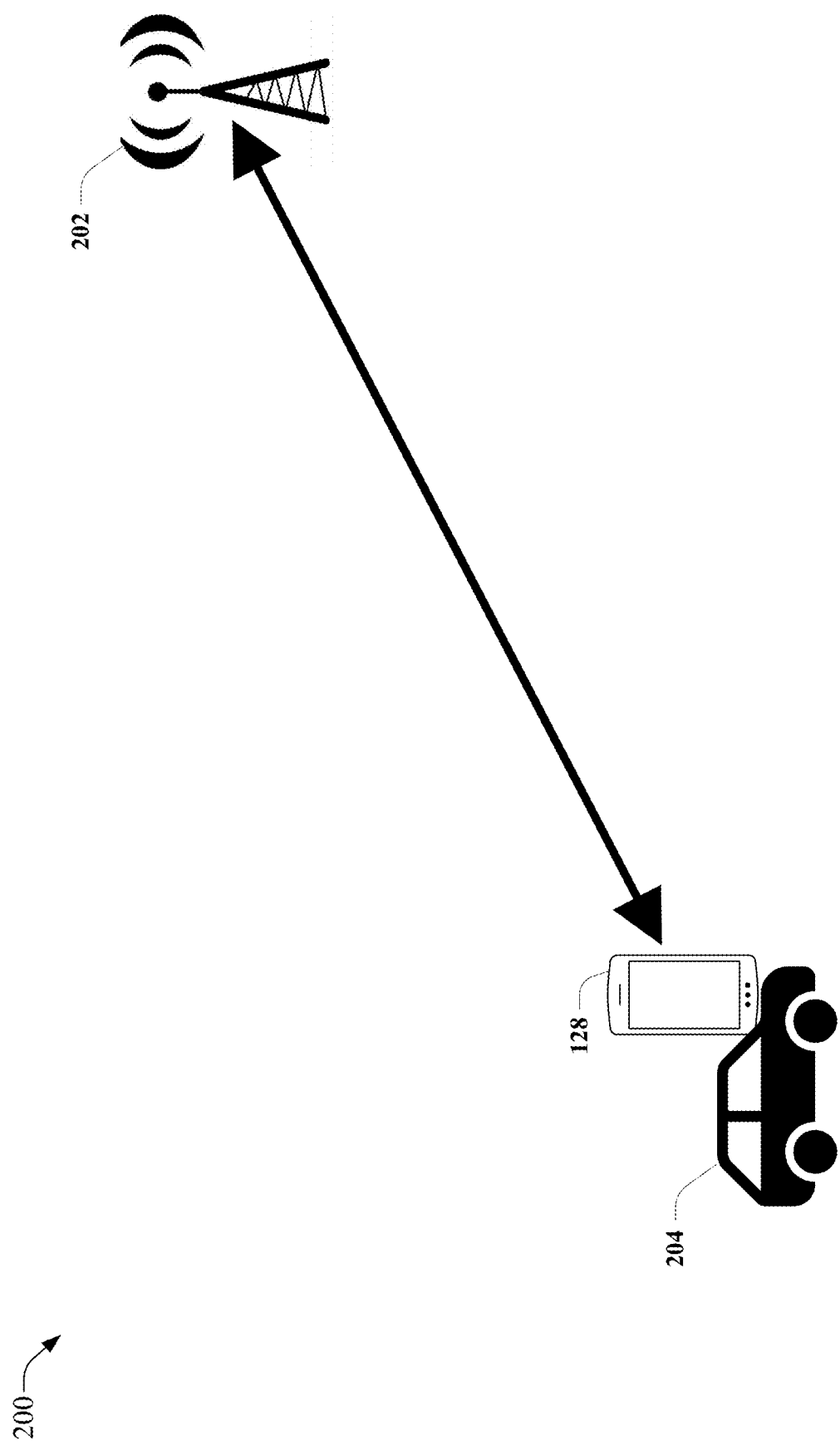
FIG. 2 is a diagram of an example scenario in accordance with one or more embodiments described herein.

Turning now to FIG. 2, there is illustrated diagram 200 of an example scenario in accordance with one or more embodiments described herein. Diagram 200 can comprise a cell 202 and a UE 128 (e.g., moving in a vehicle 204). In this example, a user can be listening to an audiobook via the UE 128 in the vehicle 204. Roads are clear with minimal traffic, however, the vehicle 204 is moving quickly and thus the UE 128 is quickly moving away from cell 202. It can be known to the system 102 that cell 202 is near a highway, that cellular conditions are good and that the current time is during off peak traffic hours, that UE 128 conditions are good, but because the UE 128 is moving quickly, the potential for channel quality fluctuation is high. In this example, the system 102 can select an MCS table that can accommodate for the high channel quality fluctuation.

Figure 3:
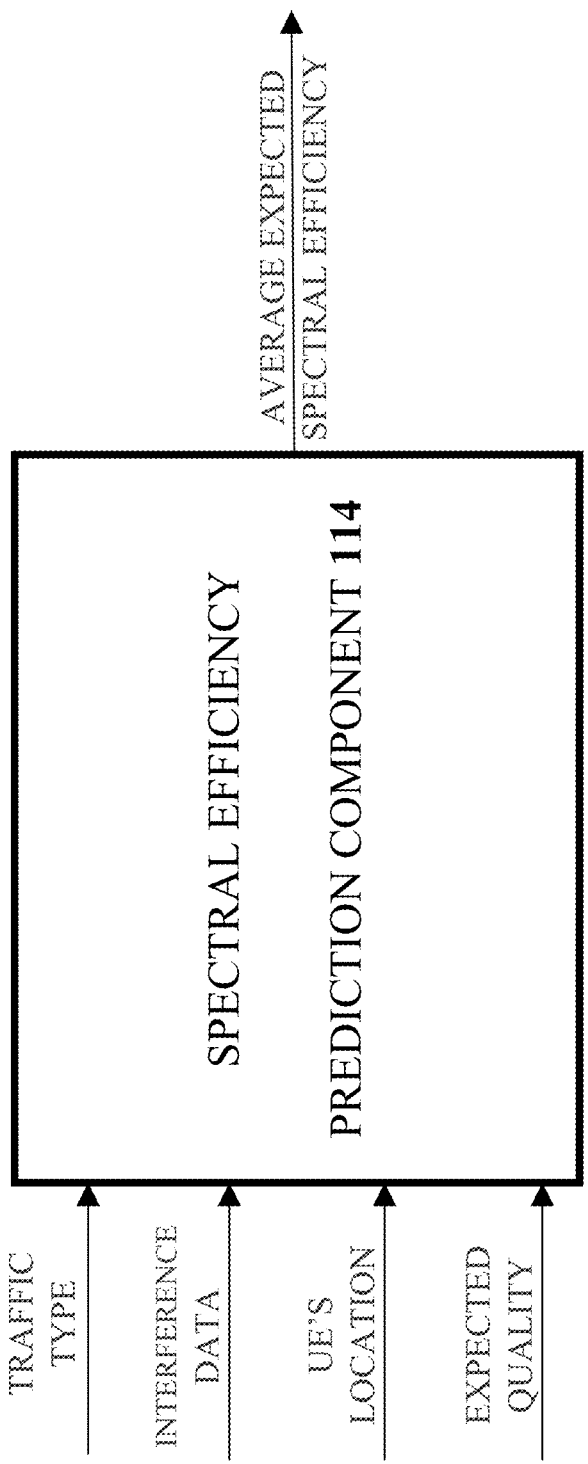
FIG. 3 is a diagram of exemplary spectral efficiency prediction in accordance with one or more embodiments described herein.
Figure 4:
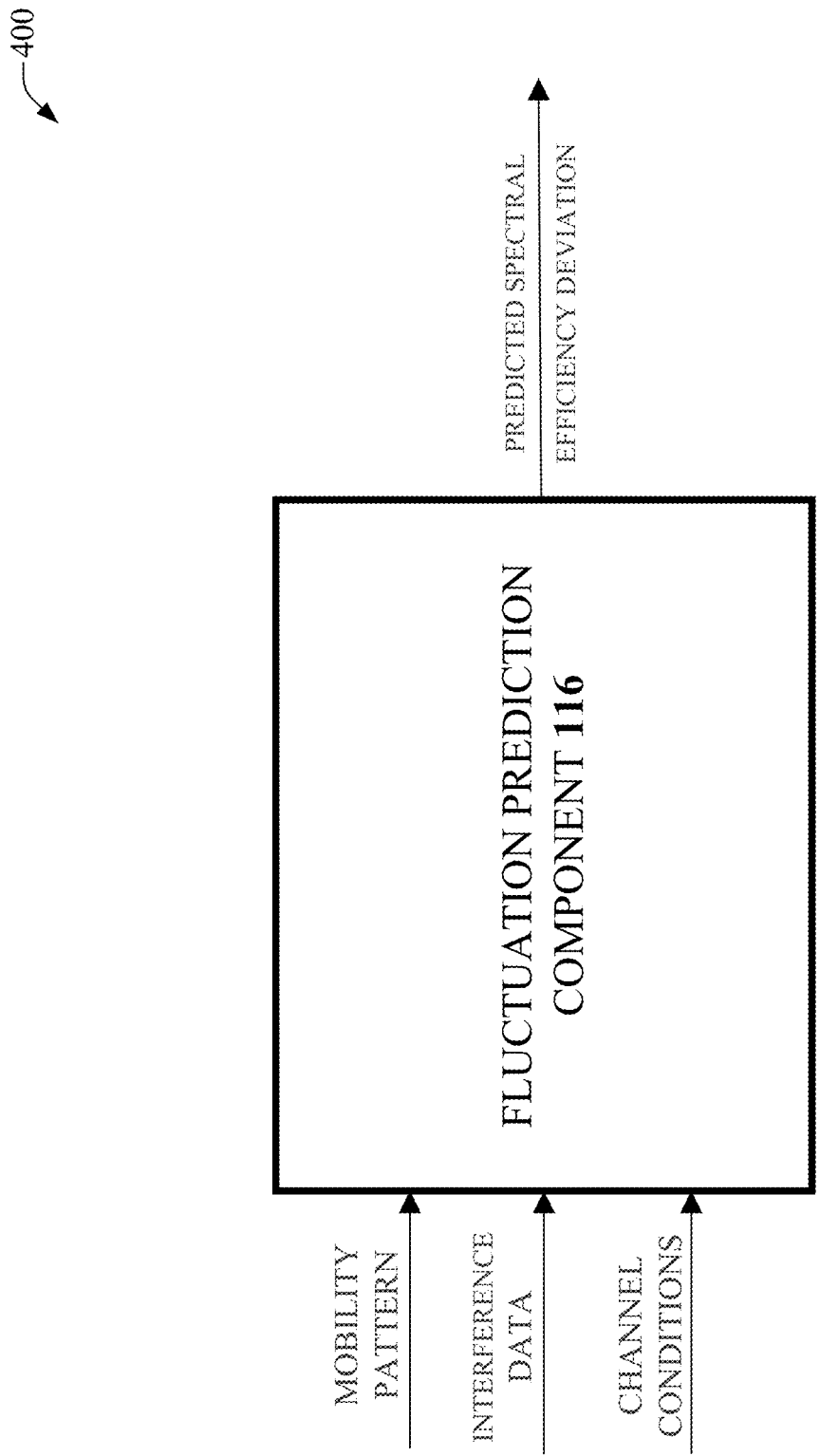
FIG. 4 is a diagram of exemplary fluctuation prediction in accordance with one or more embodiments described herein.
Figure 5:
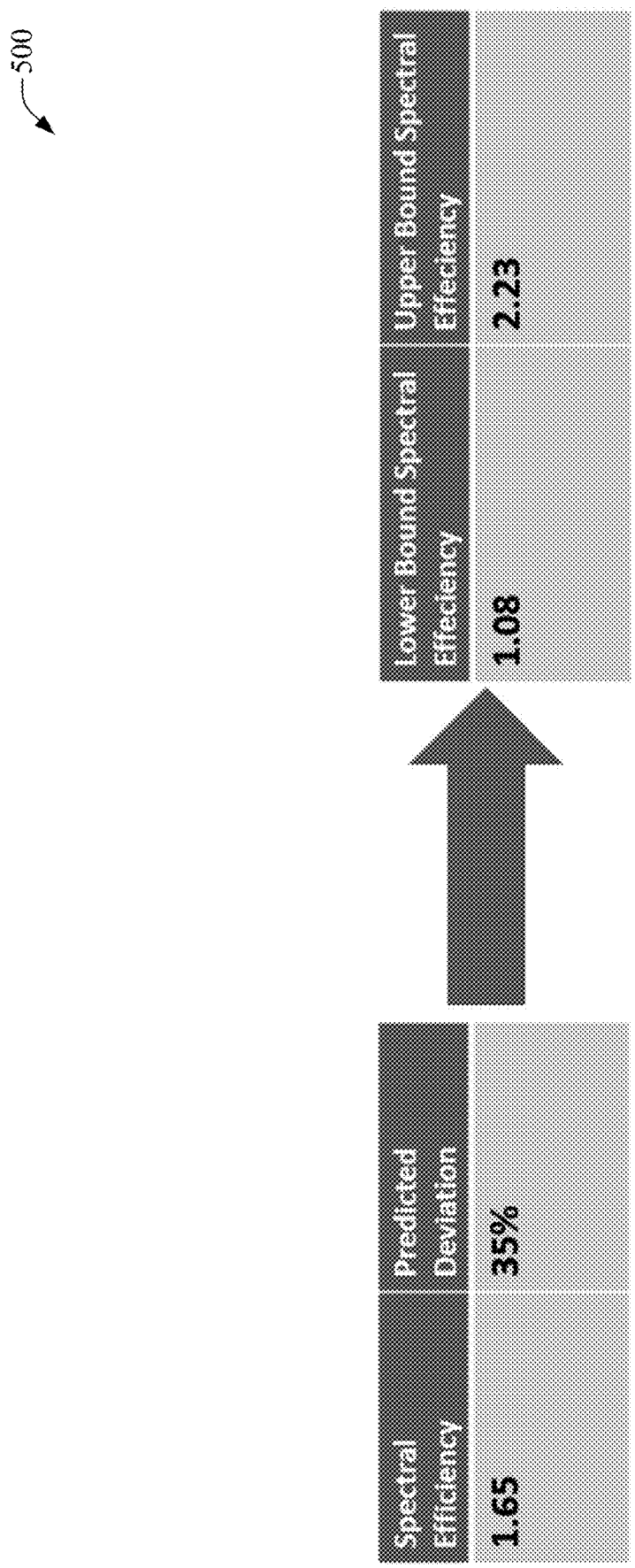
FIG. 5 is a diagram of an example scenario in accordance with one or more embodiments described herein.
Figure 6:
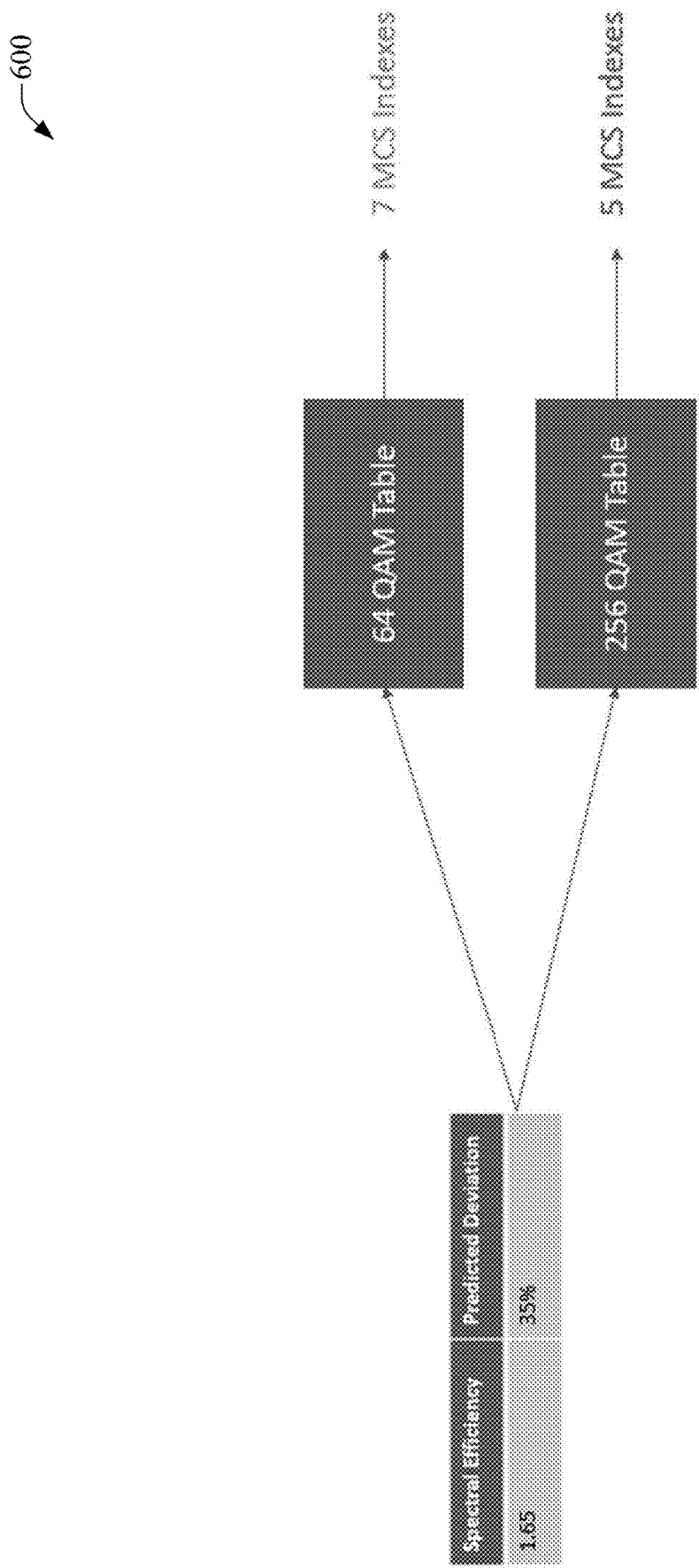
FIG. 6 is a diagram of an example scenario in accordance with one or more embodiments described herein.
Figure 7:
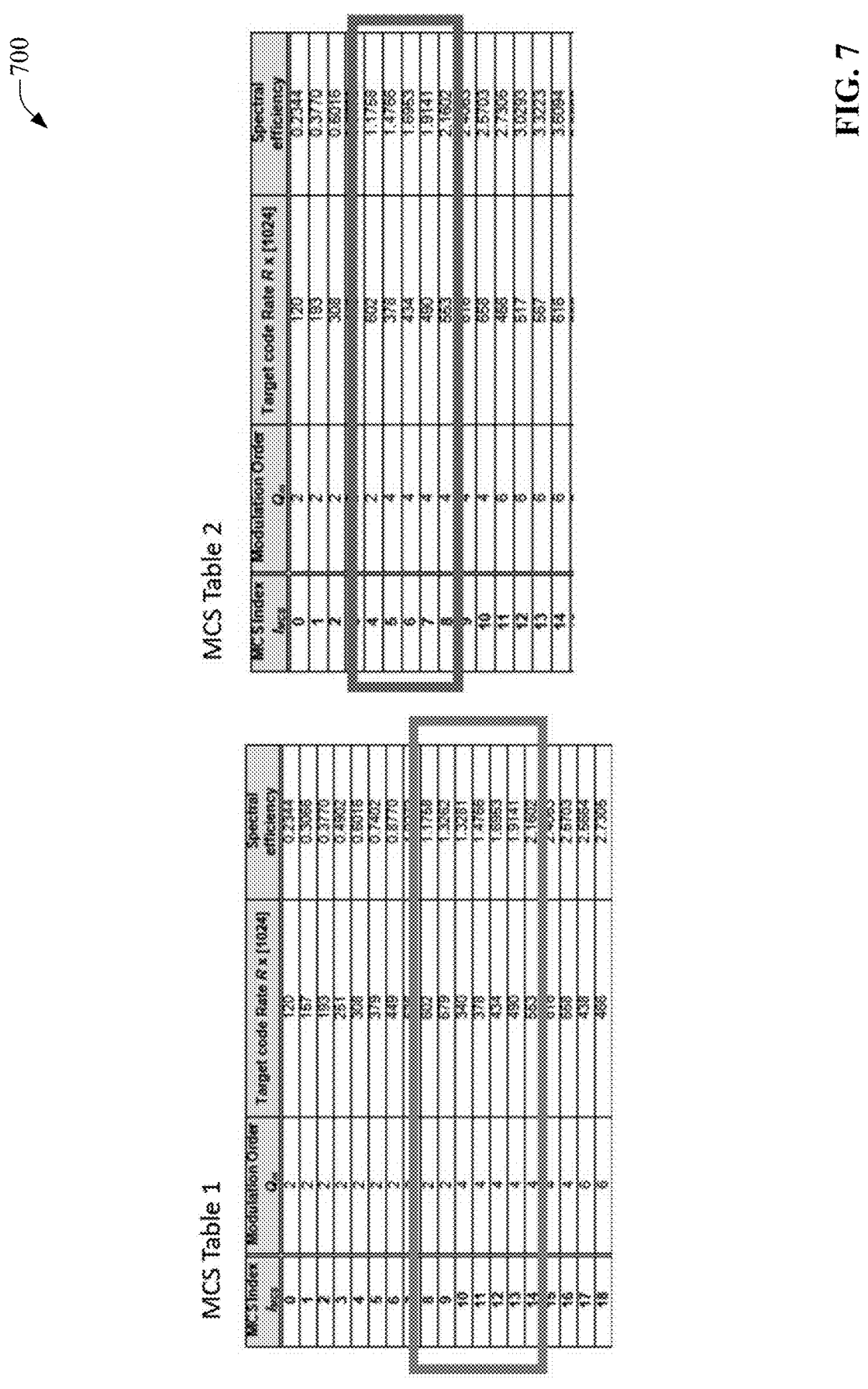

FIG. 3 illustrates a diagram 300 of exemplary spectral efficiency prediction in accordance with one or more embodiments described herein. It FIG. 3, it is noted that the spectral efficiency prediction component 114 can utilize, as input, one or more of channel quality indicator (CQI), time advance, QoS flow, traffic type, SINR, buffer status report, BLER, rank indicator, PMI, interference data, UE location, and/or expected quality. From this input, the spectral efficiency prediction component 114 can learn a pattern to forecast the expected average spectral efficiency of the UE. FIG. 4 illustrates a diagram 400 of exemplary fluctuation prediction in accordance with one or more embodiments described herein. In FIG. 4, it is noted that the fluctuation prediction component 116 can predict the range in which the spectral efficiency of the UE 128 will fluctuate. In various embodiments, the fluctuation prediction component 116 can utilize a regression model to predict the deviation of the spectral efficiency predicted by the spectral efficiency prediction component 114. The prediction by the fluctuation prediction component 116 can be output as a percentage of the UE 128 spectral efficiency. To predict the deviation of the spectral efficiency, the fluctuation prediction component 116 can utilize, as input, one or more of time advance data, BLER, automatic neighbor relations (ANR), beam location, power headroom, UE 128 mobility pattern data, interference indicator/data, and/or operational environment/channel conditions. From this input, the fluctuation prediction component 116 can predict the spectral efficiency deviation, which can be provided to the MCS table selection component 118 for post processing. FIG. 5 illustrates a diagram 500 of an example scenario in accordance with one or more embodiments described herein. In this example, the spectral efficiency prediction component 114 can determine a predicted spectral efficiency of 1.65. Further, the fluctuation prediction component 116 can determine a predicted spectral deviation of 35%. In this regard, the MCS table selection component 118 can determine a lower bound spectral efficiency of 1.08 and an upper bound spectral efficiency of 2.23. Diagram 600 of FIG. 6 and diagram 700 of FIG. 7 illustrate MCS table selection herein. As depicted in diagram 700, MCS table 1 (e.g., the 64 QAM table) can comprise seven MCS indexes in the range of 1.08 to 2.23, while MCS table 2 (e.g., the 256 QAM table) can comprise five MCS indexes in the range of 1.08 to 2.23. In this example, MCS table 1 can comprise greater granularity (e.g., more MCS indexes) than MCS table 2. Thus, the MCS table selection component 118 can select MCS table 1 for use with the UE 128.

Figure 8:
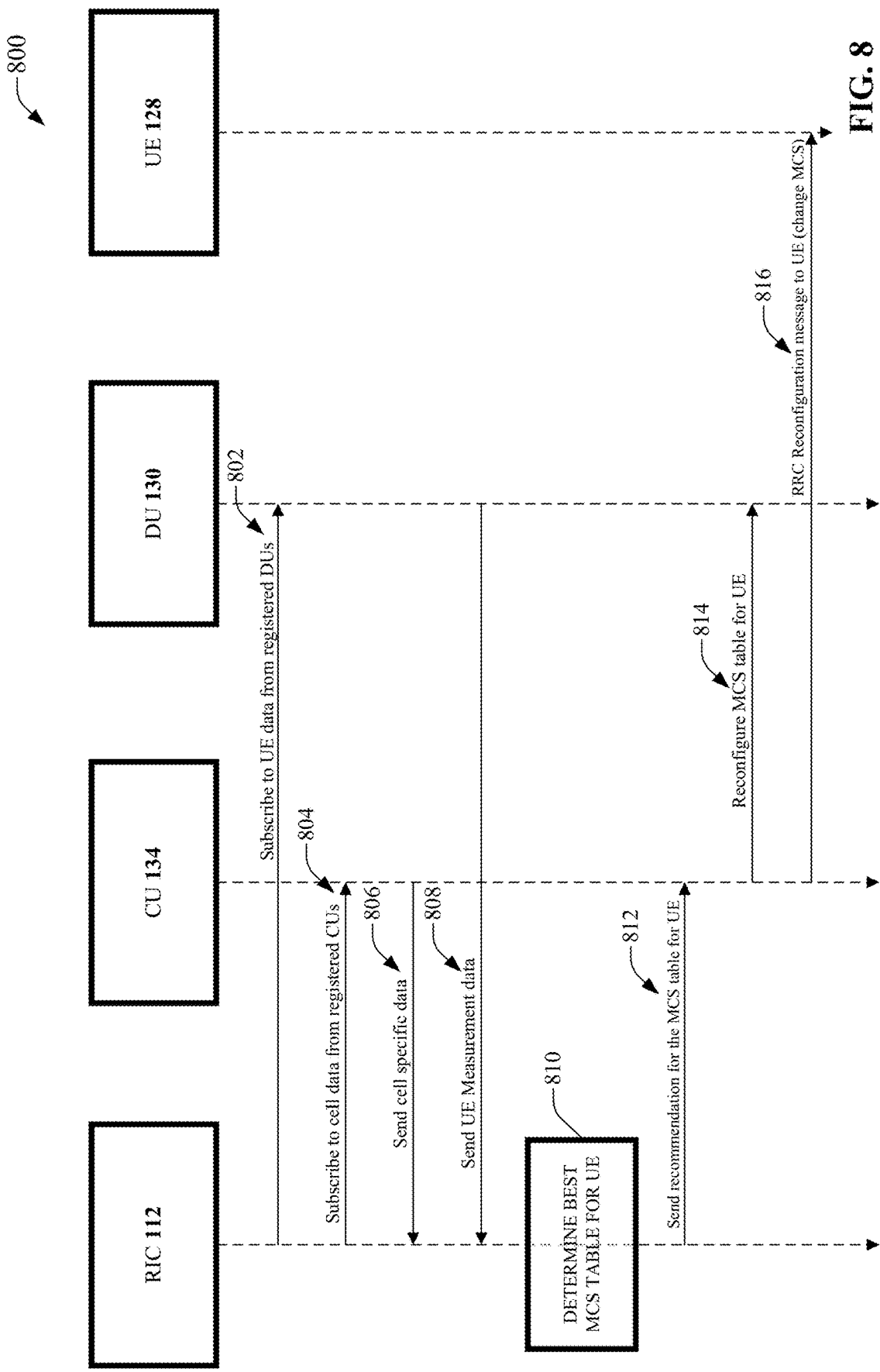
FIG. 8 is a flow chart for a process associated with spectral efficiency aware predictive modulation and coding scheme table selection in accordance with one or more embodiments described herein.

FIG. 8 is a flow chart for a process 800 associated with spectral efficiency aware predictive modulation and coding scheme table selection in accordance with one or more embodiments described herein. At 802, the RIC 112 can subscribe to UE 128 data from registered DUs 130. At 804, the RIC 112 can subscribe to cell data from registered CUs 134. At 806, a CU 134 can send cell-specific data to the RIC 112. At 808, a DU 130 can send UE 128 measurement data to the RIC 112. At 810, the RIC 112 can determine the optimal MCS table to utilize the for UE 128. At 812, the RIC 112 can send the recommendation for the MCS table for the UE 128 to a CU 134. At 814, the CU 134 can reconfigure the MCS table for the UE 128 and provide to a DU 130. At 816, the CU 134 can send a radio resource control (RRC) reconfiguration message to the UE 128 to change MCS tables to the determined MCS table from 810.

Figure 9:
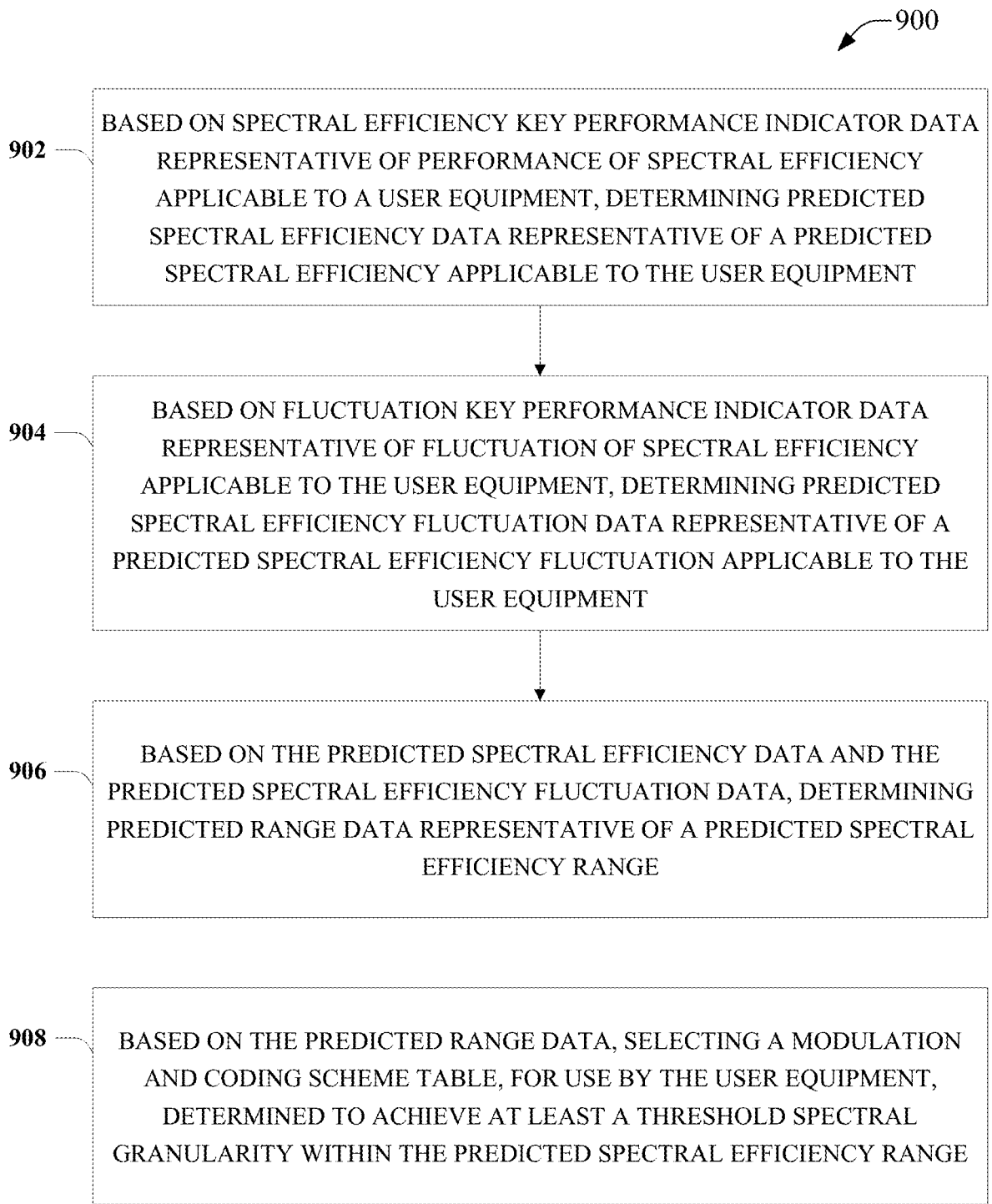
FIG. 9 is a block flow diagram for a process associated with spectral efficiency aware predictive modulation and coding scheme table selection in accordance with one or more embodiments described herein.

FIG. 9 illustrates a block flow diagram for a process 900 associated with spectral efficiency aware predictive modulation and coding scheme table selection in accordance with one or more embodiments described herein. At 902, the process 900 can comprise, based on spectral efficiency key performance indicator data representative of performance of spectral efficiency applicable to a user equipment (e.g., UE 128), determining (e.g., via the spectral efficiency prediction component 114) predicted spectral efficiency data representative of a predicted spectral efficiency applicable to the user equipment (e.g., UE 128). At 904, the process 900 can comprise, based on fluctuation key performance indicator data representative of fluctuation of spectral efficiency applicable to the user equipment (e.g., UE 128), determining (e.g., via the fluctuation prediction component 116) predicted spectral efficiency fluctuation data representative of a predicted spectral efficiency fluctuation applicable to the user equipment (e.g., UE 128). At 906, the process 900 can comprise, based on the predicted spectral efficiency data and the predicted spectral efficiency fluctuation data, determining (e.g., via the MCS table selection component 118) predicted range data representative of a predicted spectral efficiency range. At 908, the process 900 can comprise, based on the predicted range data, selecting (e.g., via the MCS table selection component 118) a modulation and coding scheme table, for use by the user equipment (e.g., UE 128), determined to achieve at least a threshold spectral granularity within the predicted spectral efficiency range.

FIG. 10 illustrates a block flow diagram for a process 1000 associated with spectral efficiency aware predictive modulation and coding scheme table selection in accordance with one or more embodiments described herein. At 1002, the process 1000 can comprise, based on spectral efficiency key performance indicator data, determining (e.g., via the spectral efficiency prediction component 114) a predicted spectral efficiency applicable to a user equipment (e.g., UE 128). At 1004, the process 1000 can comprise, based on fluctuation key performance indicator data, determining (e.g., via the fluctuation prediction component 116) predicted spectral efficiency fluctuation applicable to the user equipment (e.g., UE 128). At 1006, the process 1000 can comprise, based on the predicted spectral efficiency and the predicted spectral efficiency fluctuation, determining (e.g., via the MCS table selection component 118) a predicted spectral efficiency range. At 1008, the process 1000 can comprise, based on the predicted spectral efficiency range, selecting (e.g., via the MCS table selection component 118) a modulation and coding scheme table, for the user equipment (e.g., UE 128), determined to maximize spectral granularity within the predicted spectral efficiency range.

FIG. 11 illustrates a block flow diagram for a process 1100 associated with spectral efficiency aware predictive modulation and coding scheme table selection in accordance with one or more embodiments described herein. At 1102, the process 1100 can comprise, based on spectral efficiency key performance indicator data, determining, by network equipment comprising a processor (e.g., via the spectral efficiency prediction component 114), a predicted spectral efficiency applicable to a user equipment (e.g., UE 128). At 1104, the process 1100 can comprise, based on fluctuation key performance indicator data, determining, by the network equipment (e.g., via the fluctuation prediction component 116), predicted spectral efficiency fluctuation applicable to the user equipment (e.g., UE 128). At 1106, the process 1100 can comprise, based on the predicted spectral efficiency and the predicted spectral efficiency fluctuation, determining, by the network equipment (e.g., via the MCS table selection component 118), a predicted spectral efficiency range. At 1108, the process 1100 can comprise, based on the predicted spectral efficiency range, selecting, by the network equipment (e.g., via the MCS table selection component 118), a modulation and coding scheme table, for the user equipment (e.g., UE 128), determined to modify a spectral granularity within the predicted spectral efficiency range to satisfy a spectral granularity criterion within the predicted spectral efficiency range.

Figure 12:
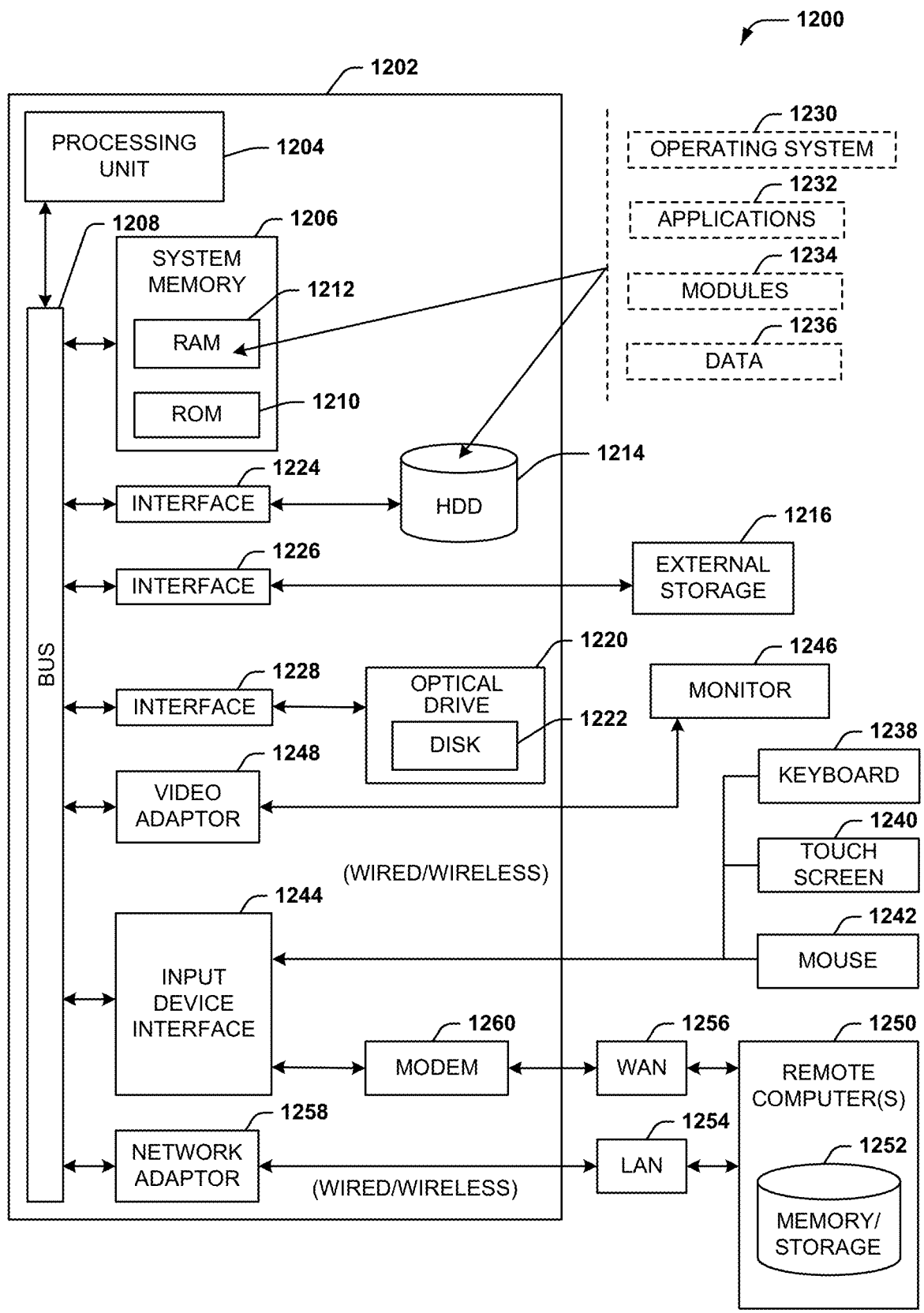
FIG. 12 is an example, non-limiting computing environment in which one or more embodiments described herein can be implemented.

In order to provide additional context for various embodiments described herein, FIG. 12 and the following discussion are intended to provide a brief, general description of a suitable computing environment 1200 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data, or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory, or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries, or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared, and other wireless media.

With reference again to FIG. 12, the example environment 1200 for implementing various embodiments of the aspects described herein includes a computer 1202, the computer 1202 including a processing unit 1204, a system memory 1206 and a system bus 1208. The system bus 1208 couples system components including, but not limited to, the system memory 1206 to the processing unit 1204. The processing unit 1204 can be any of various commercially available processors. Dual microprocessors and other multi-processor architectures can also be employed as the processing unit 1204.

The system bus 1208 can be any of several types of bus structure that can further interconnect to a memory bus (with or without a memory controller), a peripheral bus, and a local bus using any of a variety of commercially available bus architectures. The system memory 1206 includes ROM 1210 and RAM 1212. A basic input/output system (BIOS) can be stored in a non-volatile memory such as ROM, erasable programmable read only memory (EPROM), EEPROM, which BIOS contains the basic routines that help to transfer information between elements within the computer 1202, such as during startup. The RAM 1212 can also include a high-speed RAM such as static RAM for caching data.

The computer 1202 further includes an internal hard disk drive (HDD) 1214 (e.g., EIDE, SATA), one or more external storage devices 1216 (e.g., a magnetic floppy disk drive (FDD) 1216, a memory stick or flash drive reader, a memory card reader, etc.) and an optical disk drive 1220 (e.g., which can read or write from a disk 1222 such as CD-ROM disc, a DVD, a BD, etc.). While the internal HDD 1214 is illustrated as located within the computer 1202, the internal HDD 1214 can also be configured for external use in a suitable chassis (not shown). Additionally, while not shown in environment 1200, a solid-state drive (SSD) could be used in addition to, or in place of, an HDD 1214. The HDD 1214, external storage device(s) 1216 and optical disk drive 1220 can be connected to the system bus 1208 by an HDD interface 1224, an external storage interface 1226 and an optical drive interface 1228, respectively. The interface 1224 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1202, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1212, including an operating system 1230, one or more application programs 1232, other program modules 1234 and program data 1236. All or portions of the operating system, applications, modules, and/or data can also be cached in the RAM 1212. The systems and methods described herein can be implemented utilizing various commercially available operating systems or combinations of operating systems.

Computer 1202 can optionally comprise emulation technologies. For example, a hypervisor (not shown) or other intermediary can emulate a hardware environment for operating system 1230, and the emulated hardware can optionally be different from the hardware illustrated in FIG. 12. In such an embodiment, operating system 1230 can comprise one virtual machine (VM) of multiple VMs hosted at computer 1202. Furthermore, operating system 1230 can provide runtime environments, such as the Java runtime environment or the .NET framework, for applications 1232. Runtime environments are consistent execution environments that allow applications 1232 to run on any operating system that includes the runtime environment. Similarly, operating system 1230 can support containers, and applications 1232 can be in the form of containers, which are lightweight, standalone, executable packages of software that include, e.g., code, runtime, system tools, system libraries and settings for an application.

Further, computer 1202 can be enabled with a security module, such as a trusted processing module (TPM). For instance, with a TPM, boot components hash next in time boot components, and wait for a match of results to secured values, before loading a next boot component. This process can take place at any layer in the code execution stack of computer 1202, e.g., applied at the application execution level or at the operating system (OS) kernel level, thereby enabling security at any level of code execution.

A user can enter commands and information into the computer 1202 through one or more wired/wireless input devices, e.g., a keyboard 1238, a touch screen 1240, and a pointing device, such as a mouse 1242. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1204 through an input device interface 1244 that can be coupled to the system bus 1208, but can be connected by other interfaces, such as a parallel port, an IEEE 1394 serial port, a game port, a USB port, an IR interface, a BLUETOOTH® interface, etc.

A monitor 1246 or other type of display device can be also connected to the system bus 1208 via an interface, such as a video adapter 1248. In addition to the monitor 1246, a computer typically includes other peripheral output devices (not shown), such as speakers, printers, etc.

The computer 1202 can operate in a networked environment using logical connections via wired and/or wireless communications to one or more remote computers, such as a remote computer(s) 1250. The remote computer(s) 1250 can be a workstation, a server computer, a router, a personal computer, portable computer, microprocessor-based entertainment appliance, a peer device or other common network node, and typically includes many or all of the elements described relative to the computer 1202, although, for purposes of brevity, only a memory/storage device 1252 is illustrated. The logical connections depicted include wired/wireless connectivity to a local area network (LAN) 1254 and/or larger networks, e.g., a wide area network (WAN) 1256. Such LAN and WAN networking environments are commonplace in offices and companies, and facilitate enterprise-wide computer networks, such as intranets, all of which can connect to a global communications network, e.g., the Internet.

When used in a LAN networking environment, the computer 1202 can be connected to the local network 1254 through a wired and/or wireless communication network interface or adapter 1258. The adapter 1258 can facilitate wired or wireless communication to the LAN 1254, which can also include a wireless access point (AP) disposed thereon for communicating with the adapter 1258 in a wireless mode.

When used in a WAN networking environment, the computer 1202 can include a modem 1260 or can be connected to a communications server on the WAN 1256 via other means for establishing communications over the WAN 1256, such as by way of the Internet. The modem 1260, which can be internal or external and a wired or wireless device, can be connected to the system bus 1208 via the input device interface 1244. In a networked environment, program modules depicted relative to the computer 1202 or portions thereof, can be stored in the remote memory/storage device 1252. It will be appreciated that the network connections shown are examples and other means of establishing a communications link between the computers can be used.

When used in either a LAN or WAN networking environment, the computer 1202 can access cloud storage systems or other network-based storage systems in addition to, or in place of, external storage devices 1216 as described above. Generally, a connection between the computer 1202 and a cloud storage system can be established over a LAN 1254 or WAN 1256 e.g., by the adapter 1258 or modem 1260, respectively. Upon connecting the computer 1202 to an associated cloud storage system, the external storage interface 1226 can, with the aid of the adapter 1258 and/or modem 1260, manage storage provided by the cloud storage system as it would other types of external storage. For instance, the external storage interface 1226 can be configured to provide access to cloud storage sources as if those sources were physically connected to the computer 1202.

The computer 1202 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

Figure 13:
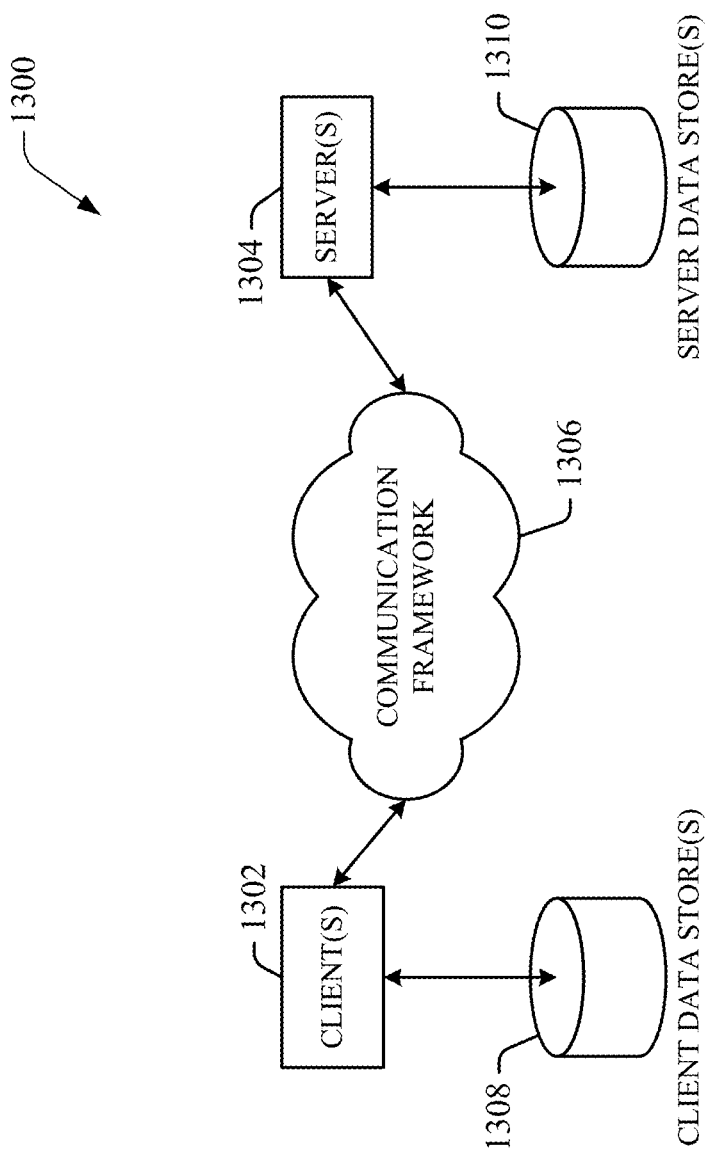
FIG. 13 is an example, non-limiting networking environment in which one or more embodiments described herein can be implemented.

Referring now to FIG. 13, there is illustrated a schematic block diagram of a computing environment 1300 in accordance with this specification. The system 1300 includes one or more client(s) 1302, (e.g., computers, smart phones, tablets, cameras, PDA's). The client(s) 1302 can be hardware and/or software (e.g., threads, processes, computing devices). The client(s) 1302 can house cookie(s) and/or associated contextual information by employing the specification, for example.

The system 1300 also includes one or more server(s) 1304. The server(s) 1304 can also be hardware or hardware in combination with software (e.g., threads, processes, computing devices). The servers 1304 can house threads to perform transformations of media items by employing aspects of this disclosure, for example. One possible communication between a client 1302 and a server 1304 can be in the form of a data packet adapted to be transmitted between two or more computer processes wherein data packets may include coded analyzed headspaces and/or input. The data packet can include a cookie and/or associated contextual information, for example. The system 1300 includes a communication framework 1306 (e.g., a global communication network such as the Internet) that can be employed to facilitate communications between the client(s) 1302 and the server(s) 1304.

Communications can be facilitated via a wired (including optical fiber) and/or wireless technology. The client(s) 1302 are operatively connected to one or more client data store(s) 1308 that can be employed to store information local to the client(s) 1302 (e.g., cookie(s) and/or associated contextual information). Similarly, the server(s) 1304 are operatively connected to one or more server data store(s) 1310 that can be employed to store information local to the servers 1304.

In one exemplary embodiment, a client 1302 can transfer an encoded file, (e.g., encoded media item), to server 1304. Server 1304 can store the file, decode the file, or transmit the file to another client 1302. It is noted that a client 1302 can also transfer an uncompressed file to a server 1304 and server 1304 can compress the file and/or transform the file in accordance with this disclosure. Likewise, server 1304 can encode information and transmit the information via communication framework 1306 to one or more clients 1302.

The illustrated aspects of the disclosure may also be practiced in distributed computing environments where certain tasks are performed by remote processing devices that are linked through a communications network. In a distributed computing environment, program modules can be located in both local and remote memory storage devices.

The above description includes non-limiting examples of the various embodiments. It is, of course, not possible to describe every conceivable combination of components or methods for purposes of describing the disclosed subject matter, and one skilled in the art may recognize that further combinations and permutations of the various embodiments are possible. The disclosed subject matter is intended to embrace all such alterations, modifications, and variations that fall within the spirit and scope of the appended claims.

With regard to the various functions performed by the above-described components, devices, circuits, systems, etc., the terms (including a reference to a "means") used to describe such components are intended to also include, unless otherwise indicated, any structure(s) which performs the specified function of the described component (e.g., a functional equivalent), even if not structurally equivalent to the disclosed structure. In addition, while a particular feature of the disclosed subject matter may have been disclosed with respect to only one of several implementations, such feature may be combined with one or more other features of the other implementations as may be desired and advantageous for any given or particular application.

The terms "exemplary" and/or "demonstrative" as used herein are intended to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent structures and techniques known to one skilled in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

The term "or" as used herein is intended to mean an inclusive "or" rather than an exclusive "or." For example, the phrase "A or B" is intended to include instances of A, B, and both A and B. Additionally, the articles "a" and "an" as used in this application and the appended claims should generally be construed to mean "one or more" unless either otherwise specified or clear from the context to be directed to a singular form.

The term "set" as employed herein excludes the empty set, i.e., the set with no elements therein. Thus, a "set" in the subject disclosure includes one or more elements or entities. Likewise, the term "group" as utilized herein refers to a collection of one or more entities.

The description of illustrated embodiments of the subject disclosure as provided herein, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as one skilled in the art can recognize. In this regard, while the subject matter has been described herein in connection with various embodiments and corresponding drawings, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A system, comprising:
   a processor; and
   a memory that stores executable instructions that, when executed by the processor, facilitate performance of operations, comprising:
   based on spectral efficiency key performance indicator data representative of performance of spectral efficiency applicable to a user equipment, determining predicted spectral efficiency data representative of a predicted spectral efficiency applicable to the user equipment;
   based on fluctuation key performance indicator data representative of fluctuation of spectral efficiency applicable to the user equipment, determining predicted spectral efficiency fluctuation data representative of a predicted spectral efficiency fluctuation applicable to the user equipment;
   based on the predicted spectral efficiency data and the predicted spectral efficiency fluctuation data, determining predicted range data representative of a predicted spectral efficiency range; and
   based on the predicted range data, selecting a modulation and coding scheme table, for use by the user equipment, determined to achieve at least a threshold spectral granularity within the predicted spectral efficiency range, wherein the selecting comprises selecting the modulation and coding scheme table determined to maximize the spectral granularity within the predicted spectral efficiency range, and wherein the modulation and coding scheme table comprises a largest quantity of modulation and coding scheme indexes from among a group of modulation and coding scheme tables applicable to the user equipment.

2. The system of claim 1, wherein the determining of the predicted spectral efficiency data comprises using a spectral efficiency prediction model generated using machine learning based on past spectral efficiency key performance indicator data, other than the spectral efficiency key performance indicator data.

3. The system of claim 1, wherein the predicted spectral efficiency data comprises average predicted spectral efficiency data representative of an average predicted spectral efficiency.

4. The system of claim 1, wherein the determining of the predicted spectral efficiency fluctuation data comprises using a spectral efficiency fluctuation prediction model generated using machine learning based on past fluctuation key performance indicator data, other than the fluctuation key performance indicator data.

5. The system of claim 1, wherein the spectral efficiency key performance indicator data comprises at least one of channel quality indicator data representative of channel qualities applicable to the user equipment, time advance data representative of time advances applicable to the user equipment, quality of service flow data representative of quality of service flows applicable to the user equipment, signal to interference plus noise ratio data representative of signal to interference plus noise ratios applicable to the user equipment, buffer status report data representative of buffer status reports applicable to the user equipment, block error rate data representative of block error rates applicable to the user equipment, rank indicator data representative of rank indicators applicable to the user equipment, or precoding matrix indication data representative of precoding matrix indications applicable to the user equipment.

6. The system of claim 1, wherein the fluctuation key performance indicator data comprises at least one of time advance data representative of time advances applicable to the user equipment, block error rate data representative of block error rates applicable to the user equipment, automatic neighbor relations data representative of automatic neighbor relations applicable to the user equipment, beam identifier data representative of beam identifiers associated with the user equipment, or power headroom data applicable to the user equipment.

7. The system of claim 1, wherein the determining of the predicted spectral efficiency data comprises determining the predicted spectral efficiency data based on at least one of traffic type, interference data representative of interference associated with the user equipment, user equipment location representative of a location of the user equipment, or an expected quality applicable to the user equipment.

8. The system of claim 1, wherein the predicted spectral efficiency fluctuation is further determined based on at least one of a mobility pattern associated with the user equipment, interference data representative of interference associated with the user equipment, or channel conditions applicable to the user equipment.

9. A non-transitory machine-readable medium, comprising executable instructions that, when executed by a processor, facilitate performance of operations, comprising:
based on spectral efficiency key performance indicator data, determining a predicted spectral efficiency applicable to a user equipment;
based on fluctuation key performance indicator data, determining predicted spectral efficiency fluctuation applicable to the user equipment;
based on the predicted spectral efficiency and the predicted spectral efficiency fluctuation, determining a predicted spectral efficiency range; and
based on the predicted spectral efficiency range, selecting a modulation and coding scheme table, for the user equipment, determined to maximize spectral granularity within the predicted spectral efficiency range, wherein the modulation and coding scheme table comprises a largest quantity of modulation and coding scheme indexes from among a group of modulation and coding scheme tables applicable to the user equipment.

10. The non-transitory machine-readable medium of claim 9, wherein the predicted spectral efficiency is further determined using a spectral efficiency prediction model generated using machine learning based on past spectral efficiency key performance indicator data, other than the spectral efficiency key performance indicator data.

11. The non-transitory machine-readable medium of claim 9, wherein the predicted spectral efficiency comprises an average predicted spectral efficiency.

12. The non-transitory machine-readable medium of claim 9, wherein the predicted spectral efficiency fluctuation is further determined using a spectral efficiency fluctuation prediction model generated using machine learning based on past fluctuation key performance indicator data, other than the fluctuation key performance indicator data.

13. The non-transitory machine-readable medium of claim 9, wherein the spectral efficiency key performance indicator data comprises at least one of channel quality indicator data, time advance data, quality of service flow data, signal to interference plus noise ratio data, buffer status report data, block error rate data, rank indicator data, or precoding matrix indication data applicable to the user equipment.

14. The non-transitory machine-readable medium of claim 9, wherein the fluctuation key performance indicator data comprises at least one of time advance data, block error rate data, automatic neighbor relations data, beam identifier data, or power headroom data applicable to the user equipment.

15. A method, comprising:
based on spectral efficiency key performance indicator data, determining, by network equipment comprising a processor, a predicted spectral efficiency applicable to a user equipment;
based on fluctuation key performance indicator data, determining, by the network equipment, predicted spectral efficiency fluctuation applicable to the user equipment;
based on the predicted spectral efficiency and the predicted spectral efficiency fluctuation, determining, by the network equipment, a predicted spectral efficiency range; and
based on the predicted spectral efficiency range, selecting, by the network equipment, a modulation and coding scheme table, for the user equipment, determined to modify a spectral granularity within the predicted spectral efficiency range to satisfy a spectral granularity criterion within the predicted spectral efficiency range, wherein the selecting to satisfy the spectral granularity criterion comprises selecting the modulation and coding scheme table determined to maximize the spectral granularity within the predicted spectral efficiency range, and wherein the modulation and coding scheme table comprises a largest quantity of modulation and coding scheme indexes from among a group of modulation and coding scheme tables applicable to the user equipment.

16. The method of claim 15, wherein the determining of the predicted spectral efficiency comprises determining the predicted spectral efficiency based on at least one of traffic type, interference data, user equipment location, or expected quality applicable to the user equipment.

17. The method of claim 15, wherein the determining of the predicted spectral efficiency fluctuation comprises determining the predicted spectral efficiency fluctuation based on at least one of mobility pattern, interference data, or channel conditions applicable to the user equipment.

18. The method of claim 15, wherein the determining of the predicted spectral efficiency comprises determining an average predicted spectral efficiency.

19. The method of claim 15, wherein the determining of the predicted spectral efficiency fluctuation comprises using a spectral efficiency fluctuation prediction model generated using machine learning based on past fluctuation key performance indicator data, other than the fluctuation key performance indicator data.

20. The non-transitory machine-readable medium of claim 9, wherein the determining of the predicted spectral efficiency fluctuation comprises determining the predicted spectral efficiency fluctuation based on at least one of mobility pattern, interference data, or channel conditions applicable to the user equipment.

* * * * *